Oct. 2, 1934.  J. W. WHITE  1,975,217
AUTOMATIC ADJUSTMENT MECHANISM FOR VEHICLE BRAKES
Filed April 6, 1931  2 Sheets-Sheet 1
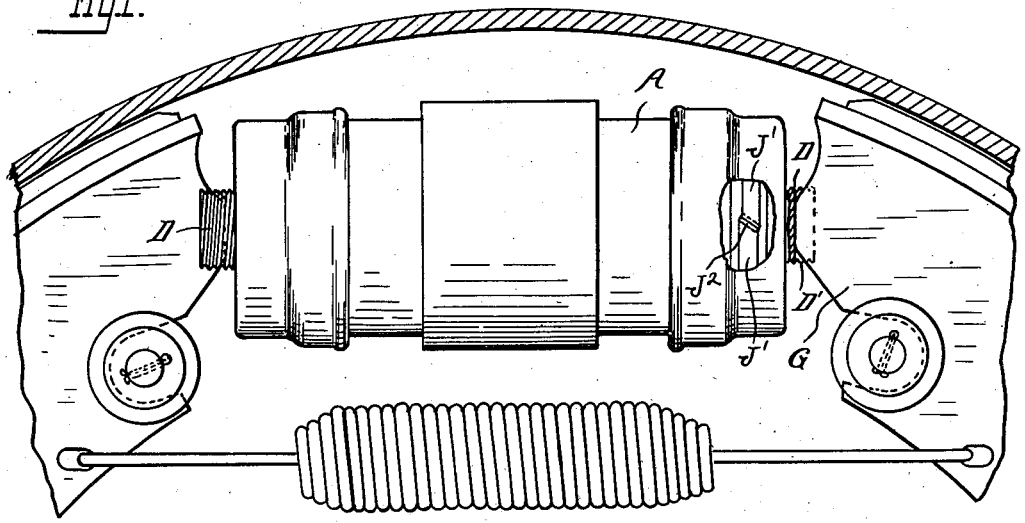
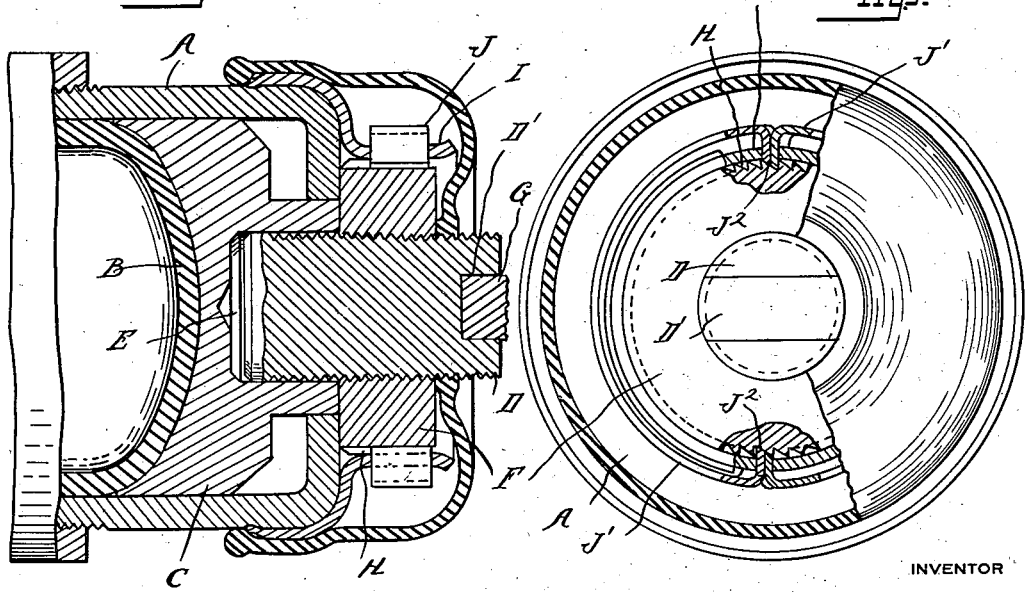
INVENTOR
John W. White
BY
ATTORNEYS

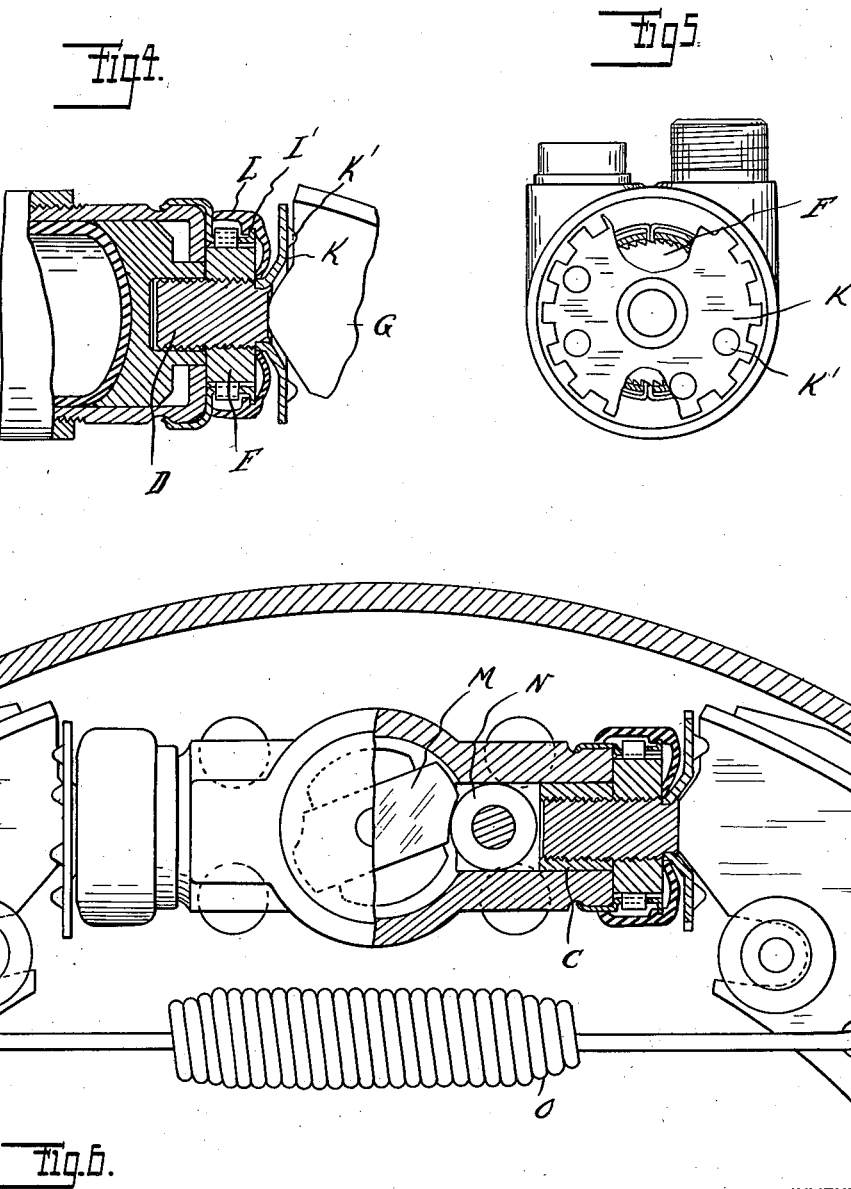

Patented Oct. 2, 1934

1,975,217

UNITED STATES PATENT OFFICE 1,975,217

AUTOMATIC ADJUSTMENT MECHANISM FOR VEHICLE BRAKES

John William White, Detroit, Mich.

Application April 6, 1931, Serial No. 528,150

3 Claims. (Cl. 188—79.5)

The invention relates to vehicle brakes and more particularly to that type known as internal, where shoes within a brake drum are moved oppositely into or out of frictional contact with the peripheral flange of said drum. Heretofore automatic adjustment mechanisms have been devised which permit only a limited free movement of the shoes while any movement in excess of this limit will effect an automatic adjustment. One serious objection to such constructions is that no provision is made for compensating for expansion and contraction under varying temperatures. Thus if the mechanism is so set as to properly function when the brake drum is cold, the expansion of this drum when heated, particularly by repeated or long applications of the brake, will bring about an automatic adjustment and subsequently when the drum cools the brakes may drag. To avoid such a result it is necessary to provide sufficient clearance before automatic adjustment takes place to take care of expansion as well as normal clearance, but this also is objectionable as it increases the amount of movement in the brake pedal required for setting the brakes.

It is the object of the present invention to obtain a construction of automatic brake adjustment mechanism which in its action is independent of expansion and contraction due to temperature changes and which also permits of close setting so as to reduce the amount of pedal movement to the minimum. To this end the invention consists in the construction as hereinafter set forth.

My improvement is applicable either to hydraulically operated or mechanically operated brakes, and in the drawings Figure 1 is an elevation partly in section illustrating the construction as applied to hydraulic brakes;

Figure 2 is an enlarged longitudinal section through a portion of the actuating mechanism showing the automatic adjustment applied thereto;

Figure 3 is a transverse section;

Figure 4 shows a modified construction where the automatic adjustment mechanism is combined with the manually operable adjustment mechanism;

Figure 5 is an end elevation partly in section of Figure 4;

Figure 6 is a section similar to Figure 1 showing my improvement applied to a mechanical actuating mechanism.

As shown in Figure 2, A is a cylindrical housing arranged to extend between the actuating ends of the brake shoes on opposite sides of the brake drums; B is an expansible sack within the casing A which lies adjacent to a piston or plunger C and which under hydraulic pressure will actuate said plunger in an outward direction. D is a threaded stud engaging a recess E in the end of the plunger C, F is a nut upon the stud which bears against the end of the plunger C and when rotatively adjusted upon the stud D will move the latter outward or inward in relation to the plunger. The outer end of the stud D bears against the brake shoe G, being preferably slotted at D' to embrace the web or flange of the shoe and to be held thereby from turning.

With the construction as thus far described, it is evident that to adjust the mechanism to compensate for wear in the brake linings or for any other purpose, it is only necessary to revolve the nut F on the stud D which by moving said stud outward or inward will correspondingly change the relation of the brake shoe to the actuating plunger C. Such adjustment I accomplish automatically by mechanism of the following construction:

The nut F is provided with ratchet teeth H in its peripheral surface and these teeth are inclined to the axis of rotation, preferably at an angle of approximately 30°. Surrounding the nut and mounted upon the casing A is a sleeve I and mounted on this sleeve is a spring pawl J having a radially extending portion passing through an aperture in the sleeve into engagement with the ratchet teeth on the nut. The sleeve I will hold the pawl J from any movement other than radial but the nut F and ratchet teeth H thereon will be moved axially in relation to the pawl each time the brake is applied. Thus during the outward movement of the plunger C actuated by the hydraulic pressure in the sack B, if this movement is sufficient, the inclined ratchet tooth on the nut F which is in engagement with the pawl J will pass out of engagement therewith, permitting the pawl to engage with the next succeeding ratchet tooth. During this movement the nut F will be held from turning because of the brake load, but during the return movement when the brake shoes are retracted, the nut will be unloaded and will therefore be free to be turned by the sliding of the pawl J along the shoulder of the ratchet tooth H.

The mechanism just described will cause an automatic adjustment each time the brake is applied, but as the wear of the brake linings is comparatively slight it is desirable to reduce this adjustment to a very slight amount. The axial advancement of the stud D for each actuation of the brake is dependent upon the pitch of the thread of said stud and also upon the number of ratchet teeth in the peripheral face of the nut. It is not practical to use either an exceedingly fine thread or exceedingly minute ratchet teeth and therefore to reduce the amount of adjustment I preferably employ the following construction:

Instead of using a single pawl J, I provide a plurality of pawls so positioned relative to each other that they will successively engage with the ratchet teeth H which is the same in effect as dividing each ratchet tooth into an equal number of parts. Preferably the pawls are formed of resilient sheet metal segmental bands J' which extend half way around the sleeve I and are provided at their opposite ends with radially extending portions J² which are inclined at an angle corresponding to that of the ratchet teeth H and passed through apertures in the sleeve I. A second segmental member J' is arranged to embrace the opposite side of the sleeve I and the radially inwardly extending end portions J' thereof lie adjacent to those of the first mentioned member, passing through the same slots in the sleeve I. These slots are so positioned that the radial portions J will successively engage with the ratchet teeth, and the amount of adjustment effected by each engagement is only one-fourth the width of one ratchet tooth. Thus the amount of advancement of the stud D for any one actuation of the plunger C is very minute.

In the normal use of the brake, if the amount of free movement of the plunger C in setting the brake remains within a certain limit, there will be no adjustment, for this movement will not be sufficient to disengage one of the pawls from a ratchet tooth and to engage another tooth therewith. If, however, this amount of movement is increased, either by reason of wear in the brake lining or by expansion of the brake drum when heated, adjustment will take place and each actuation of the brake will effect a rotative adjustment of the nut F equal to one-fourth of one ratchet tooth. The amount of axial adjustment of the stud is so slight that even where the operator frequently applies the brakes the total amount of adjustment is little if any greater than the total amount of wear. Thus the adjustment which is effected by reason of the expansion of the drum due to heating will not be sufficient to cause dragging of the brakes when the drum again cools.

Where it is necessary to manually adjust the brakes this might be accomplished by the reciprocation of the brake pedal, but on account of the minute adjustment in each reciprocation it would require a very large number to effect any substantial change. I have therefore provided an auxiliary adjustment means which can be manually operated and will effect adjustment much more rapidly. This is illustrated in Figures 4 and 5, the construction being as follows:

Instead of providing the stud D with a slot D' as illustrated in Figure 2, the stud has secured to its outer end a rotary disk K. The web of the brake shoe G has a projecting portion which bears against the end of the stud D and the disk K which is preferably slightly dished is provided near its periphery with a series of projecting lugs or struck out portions K' spaced to embrace the web of the shoe between each pair of lugs so as to hold the disk from rotation. However, whenever it is desired to effect a manual adjustment the disk may be rotated, the lug K' springing over the web of the shoe and in this manner the stud D is directly revolved so as to screw the nut F outward or inward thereon. This adjustment does not in any way interfere with the automatic adjustment mechanism which will be equally operative in all positions of the disk K.

To protect the ratchet wheels and pawls from dust or dirt which might interfere with operation, a rubber boot L is preferably snapped over the sleeve I being in the construction shown in Fig. 4 provided with a recess for engaging an outwardly extending flange I' on said sleeve which holds the boot from disengagement.

Figure 6 illustrates the construction applied to mechanically actuated brakes in which a cam M actuates a roller N on the plunger C', the construction being otherwise the same as previously described. A spring O or other suitable means connecting the two shoes of the brake may be used for retracting said shoes when the brake is released.

What I claim as my invention is:

1. The combination with a brake drum, of a brake shoe therein, a reciprocatory actuating member in alignment with the end of said shoe, a spacer between the end of said shoe and said reciprocatory member comprising a screw threaded stud bearing on one of said members and a screw threaded nut engaging said stud bearing on the other of said members, said nut having ratchet teeth in its peripheral face which teeth are inclined to the axis of rotation, a pawl having a correspondingly inclined tooth for engagement with said ratchet teeth, and means for holding said pawl from movement in the axial direction of said threaded stud, whereby an axial movement of said stud in excess of a predetermined limit will disengage one of the ratchet teeth of said nut from said pawl and engage another ratchet tooth therewith.

2. The combination with a brake drum, of a brake shoe therein, a reciprocatory actuating member in alignment with the end of said shoe, a spacer between said actuating member and said shoe comprising a screw threaded stud and a nut having a threaded engagement with the same, said nut being provided on its peripheral face with ratchet teeth inclined to the axis of said stud, a plurality of pawls for engaging said ratchet teeth and positioned to successively engage the same and means for holding said pawls from movement axially of said stud whereby an axial movement of the stud in excess of a predetermined limit will effect a disengagement of one of said pawls from its ratchet tooth and the engagement of another of said pawls with a ratchet tooth and the relative rotation of said nut and stud to increase the effective length of the spacer.

3. The combination with a brake drum, of a brake shoe therein, a reciprocatory actuating member in alignment with the end of said shoe, a spacer between said reciprocatory member and the end of the shoe comprising a screw threaded stud, a nut having a threaded engagement with said stud, one bearing on one of said members and the other upon the other member, said nut being provided with ratchet teeth in its peripheral face inclined to the axis of the stud, a stationary sleeve surrounding said nut, a segmental spring embracing said sleeve and provided at its opposite ends with radially extending pawl members inclined to correspond to the inclination of said ratchet teeth and passing through apertures in said sleeve for the purpose described.

4. The combination with a brake drum and a brake shoe therein, of a reciprocatory actuating member in alignment with the end of said shoe, a spacer intermediate said shoe and reciprocatory member comprising a screw threaded stud bearing on one of said members and a screw threaded nut engaging said stud bearing on the other of said members, said nut having ratchet teeth in its peripheral face inclined to the axis of rotation, a stationary sleeve surrounding said nut, a segmental spring embracing said sleeve and provided at its opposite ends with radially extending pawl members inclined to correspond to the inclination of said ratchet teeth and passing through an aperture in said sleeve to engage said ratchet teeth, and a boot on said sleeve surrounding and enclosing said segmental spring.

5. The combination with a brake drum, of a brake shoe therefor, a reciprocatory actuating member for applying said brake shoe to said drum, resilient means for retracting said shoe, a spacer intermediate said shoe and reciprocatory member comprising a pair of members cooperating on a relative rotation thereof to increase the effective length of said spacer, and means for automatically relatively rotating said members comprising a ratchet wheel and pawl, the one carried by one of said members and the other anchored to a non-reciprocating part, the engaging teeth of said ratchet and pawl being inclined to the direction of reciprocation whereby said reciprocatory movement in one direction in excess of a predetermined limit will engage the pawl with a succeeding ratchet tooth, and movement in the opposite direction will rotate said rotatable member to increase the effective length of said spacer.

6. The combination with a brake drum, of a brake shoe therefor, a reciprocatory actuating member for applying said brake shoe to said drum, resilient means for retracting said shoe, a spacer intermediate said shoe and reciprocatory member comprising a pair of members cooperating on a relative rotation thereof to increase the effective length of said spacer, and means for automatically relatively rotating said members comprising a ratchet wheel and a plurality of pawls, the one carried by one of said members and the other by a non-reciprocating part, the teeth of said ratchet and pawl being inclined to the direction of reciprocation and the teeth of the several pawls being positioned to successively engage the ratchet teeth, whereby said reciprocatory movement in one direction in excess of a predetermined limit will engage one of said pawls with a succeeding ratchet tooth, the movement in the opposite direction will rotate said rotatable member to increase the effective length of said spacer, said pawls being successively engaged by succeeding excess reciprocatory movements.

7. The combination with a brake drum, of a brake shoe therefor, a reciprocatory actuating member for applying said brake shoe to said drum, resilient means for retracting said shoe, a spacer intermediate said shoe and reciprocatory member comprising a pair of relatively rotatable threaded members, and means for automatically relatively rotating said members comprising a ratchet wheel and pawl, the one carried by one of said members and the other anchored to a non-reciprocating part, the engaging teeth of said ratchet and pawl being inclined to the direction of reciprocation whereby said reciprocatory movement in one direction in excess of a predetermined limit will engage the pawl with a succeeding ratchet tooth, and movement in the opposite direction will rotate said rotatable member to increase the effective length of said spacer.

8. The combination with a brake drum, of a brake shoe therefor, a reciprocatory actuating member for applying said brake shoe to said drum, resilient means for retracting said shoe, a spacer intermediate said shoe and reciprocatory member comprising a pair of members cooperating on a relative rotation thereof to increase the effective length of said spacer, means for automatically relatively rotating said members comprising a ratchet wheel and pawl, the one carried by one of said members and the other anchored to a non-reciprocating part, the engaging teeth of said ratchet and pawl being inclined to the direction of reciprocation whereby said reciprocatory movement in one direction in excess of a predetermined limit will engage the pawl with a succeeding ratchet tooth, and movement in the opposite direction will rotate said rotatable member to increase the effective length of said spacer, and a member surrounding and enclosing said ratchet wheel and pawl.

JOHN WILLIAM WHITE.